United States Patent [19]

Cok

[11] Patent Number: 5,793,886
[45] Date of Patent: Aug. 11, 1998

[54] METHOD OF ADJUSTING IMAGE PIXEL VALUES WITHIN AN IMAGE SEQUENCE BY INTERPOLATION OF TARGET CUMULATIVE HISTOGRAMS FOR IMAGES TO BE ADJUSTED

[75] Inventor: David R. Cok, Rochester, N.Y.

[73] Assignee: Eastman Kodak Company, Rochester, N.Y.

[21] Appl. No.: 769,973

[22] Filed: Dec. 19, 1996

[51] Int. Cl.⁶ ............................................. G06K 9/00
[52] U.S. Cl. ................... 382/169; 358/458; 348/700
[58] Field of Search .............................. 382/167, 169, 382/168, 274, 275; 358/443, 447, 455, 458, 461, 518, 522; 348/384, 390, 699, 700, 701, 702

[56] References Cited

U.S. PATENT DOCUMENTS

| | | | |
|---|---|---|---|
| 5,008,739 | 4/1991 | D'Luna et al. | 348/246 |
| 5,296,941 | 3/1994 | Izawa et al. | 358/458 |
| 5,315,389 | 5/1994 | Izawa et al. | 382/169 |
| 5,388,168 | 2/1995 | Sakashita et al. | 382/169 |
| 5,490,222 | 2/1996 | Sugimoto | 382/168 |
| 5,495,428 | 2/1996 | Schwartz | 382/167 |

*Primary Examiner*—Joseph Mancuso
*Assistant Examiner*—Samir Ahmed
*Attorney, Agent, or Firm*—Francis H. Boos, Jr.

[57] ABSTRACT

A method of interpolating a reference cumulative histogram for a source image located within an image sequence, the reference cumulative histogram to be used to adjust image pixel code values of the source image to remove unwanted variations in color or tone, e.g. "flicker", while preserving an intended variation, e.g. "fade to black" in the color or tone occurring during the course of the image sequence. The method employs conversion of cumulative histograms derived from reference image frames at opposite ends of the image sequence into inverse cumulative histograms and the weighted averaging of these inverse cumulative histogram values based on the time location of the source image frame in the sequence to derive an interpolated inverse cumulative histogram which is then converted into the reference cumulative histogram used for adjusting pixel code values, for example by histogram matching, to remove the undesired variation in color or tone without loss of the intentional variation in color or tone.

3 Claims, 2 Drawing Sheets

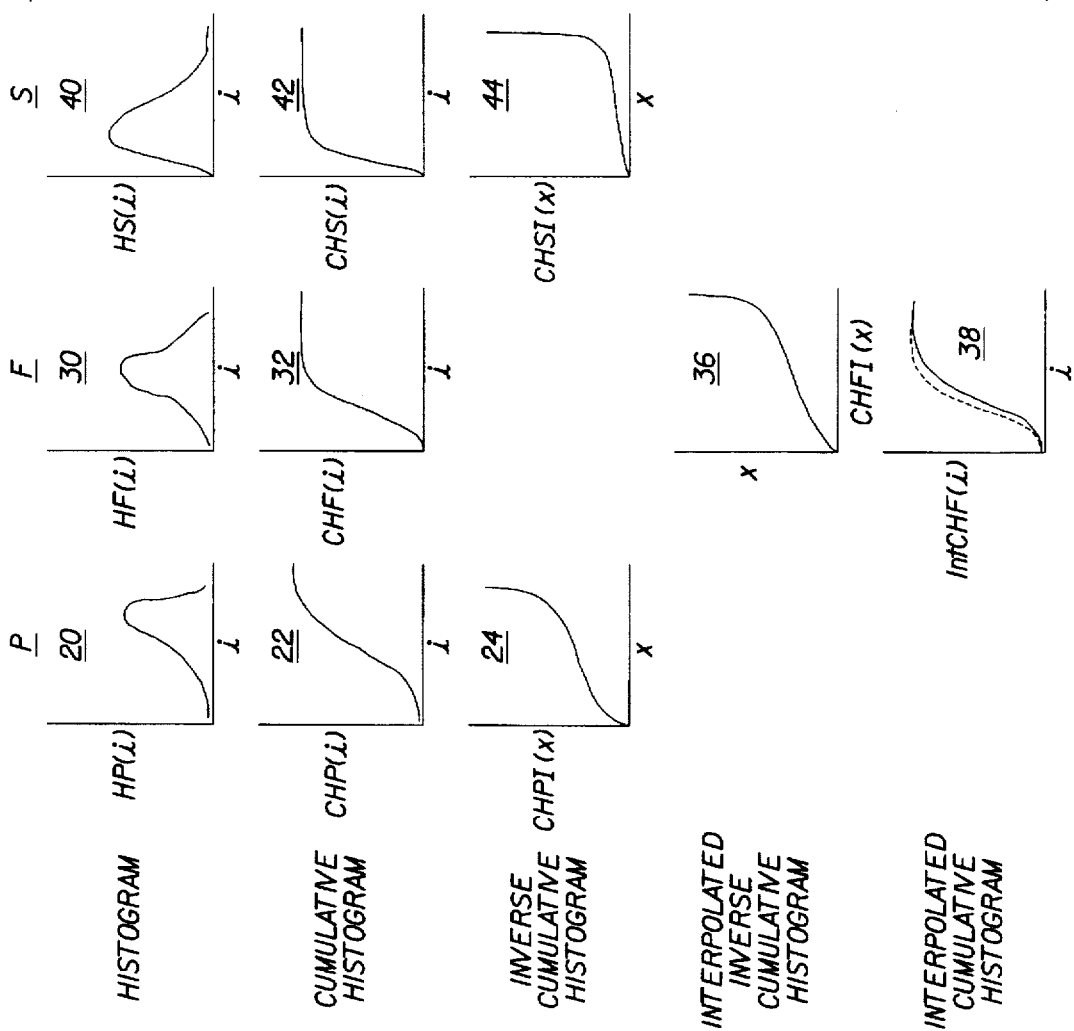

METHOD OF ADJUSTING IMAGE PIXEL VALUES WITHIN AN IMAGE SEQUENCE BY INTERPOLATION OF TARGET CUMULATIVE HISTOGRAMS FOR IMAGES TO BE ADJUSTED

FIELD OF THE INVENTION

This invention relates generally to the field of digital image processing. More specifically, the invention relates to a method for removing unwanted image flicker from a sequence of images, particularly motion image sequences, in which the image sequence has an intended image variation, such as "fade-to-black" that is not to be removed.

BACKGROUND OF THE INVENTION

Digital image processing techniques are known that are capable of adjusting an image component, such as color or tone scale, to conform to a reference image having a desired level of such component. For example, an image having an undesirably dark tone scale can be lightened up by employing one of such techniques to adjust the image to match a reference image that has a desirable, lighter tone scale. One known technique, referred to as "histogram matching" generates cumulative histograms of the reference image and the source image which is to be adjusted, and generates a lookup table (LUT) of image pixel code values for each image at corresponding cumulative histogram levels and then employs the LUT to map out adjusted image pixel code values for each image pixel code value in the source image. Other techniques for adjusting color or tone scale of a source image to a reference image are techniques that match the overall average color or the average color within a specified image area.

These image adjusting techniques are commonly employed in adjusting a still image to a reference image. They are also of value in adjusting a sequence of motion images to a single reference image when the sequence of motion images does not have intentional variations in the color or tone scale component. Where the sequence does have such intentional variations, adjusting the sequence of images to a single reference image is not appropriate. For example, the image sequence may have an intentional fade-to-black such as might be employed between scene changes. In this case the color balance or brightness of the image sequence intentionally varies. What is desired, however, is that the variation in the sequence be smooth and not contain rapid flickering components.

It is an object of the invention, therefore, to provide a method for adjusting images in a motion sequence that compensates for undesired variations in a component of the image, such as color or tone scale, without adversely affecting intentional variations in such component.

It is another object of the invention to provide a method for interpolating a cumulative histogram for an intermediate source image within a sequence of images having an intentionally varying image component, the interpolated cumulative histogram being derived from cumulative histograms of reference images in the sequence occurring before and after the source image.

SUMMARY OF THE INVENTION

In accordance with the invention, therefore, there is provided a method of interpolating a reference cumulative histogram for a source image frame located within an image sequence bounded by prior and subsequent key image frames. The reference cumulative histogram is to be used in adjusting image pixel code values of the source image frame to remove an undesired variation in an image component of the source image frame, while preserving an intentional change in the image component. The method of the invention comprises the steps of generating values of a cumulative histogram of image pixel code values of comparable image areas of each of the prior and subsequent key image frames; and converting the values of the key frame cumulative histograms to values of inverse cumulative histograms. The method further includes the steps of generating values of an interpolated inverse cumulative histogram from the values of the key frame inverse cumulative histograms based on the relative time position of the source image frame between the key image frames; and then converting the values of the interpolated inverse cumulative histogram to values of an interpolated reference cumulative histogram for the source image frame to be used in adjusting image pixel values of the source image for removal of the undesired variation of the intentional image component change.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 3 is a series of graphs of image pixel code value histograms and cumulative histograms which illustrate one embodiment of the method of the invention.

DETAILED DESCRIPTION OF THE INVENTION

Figure 1:
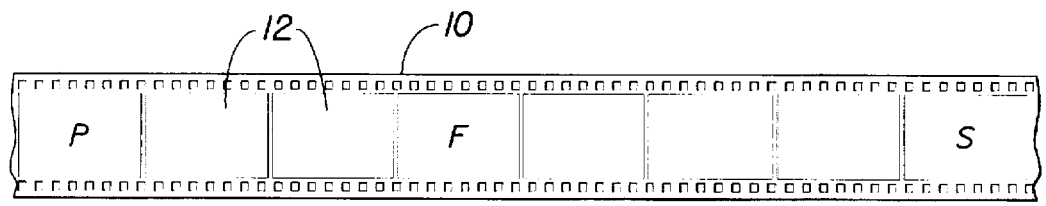
FIG. 1 shows an image sequence such as might be the case with motion picture film.

In FIG. 1, a strip of motion picture film 10 is shown with a sequence of image frames 12 which might correspond to a scene shot or a portion of a scene shot in a motion picture sequence. Only a few image frames are represented although it will be appreciated that, in an actual situation, the scene shot may include a long series of image frames in the sequence.

Figure 2:
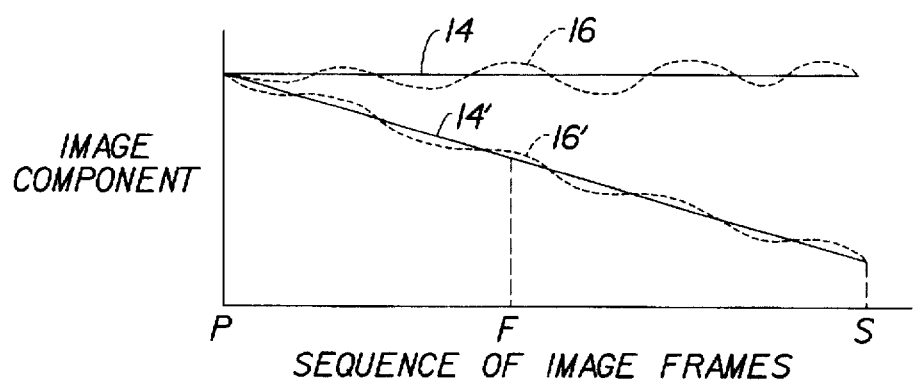
FIG. 2 is a graph showing intended and undesired variations in an image frame component over a sequence of image frames.

FIG. 2 shows a graph representing levels of an image component, such as color or tone (brightness) for each frame in the image sequence. Solid line 14 represents an image component that is relatively constant over the sequence extending from image frame P to image frame S while dotted line 16 represents an undesired rapid variation superimposed on the image component level that becomes visually apparent in the intermediate image frames F as "flicker" in the viewed image sequence. Such flicker might be caused by varying lamp brightness in the exposure of a motion picture print or by a varying shutter in the original motion picture photography. If the image sequence represents a scene with a relatively constant level of brightness, it would be acceptable to select a single reference image frame, such as the first frame in the sequence, that best represents the desired color and/or tone content and then perform one of the above mentioned techniques of digital image processing on each of the other image frames in the sequence to adjust the code values of the other frames to match those of the reference frame, thereby removing the flicker component in the other image frames. However, if the image sequence contains a known varying color or tone component, such as would be the case in, for example, a "fade to black" situation, represented in the graph by solid line 14', such image processing to adjust to a single reference frame would have the effect of removing the desired change 14' as well as the undesired flicker component 16'.

In FIG. 3, a series of graphs is shown which illustrates the method of the invention by which an interpolated reference cumulative histogram is generated for a source image within an image sequence such that the interpolated reference cumulative histogram reflects the intended image component level at the time position of the source image. This interpolated reference cumulative histogram is then available to serve as a reference for adjusting the image pixel values of the source image to remove the undesired variation in the image component level while leaving the intended level of the image component intact. In effect, for the image component of frame F, there is defined a reference point lying on solid line 14' to which the corresponding point on dotted line 16' can be adjusted to thereby eliminate the apparent flicker component.

In FIG. 3, graphs 20 and 40 are histograms of image pixel values from selected key image frames P and S in the sequence which are, respectively before and after the source frame F which is to be adjusted. These key frames P and S are selected for their relatively accurate color or tone level at their respective time positions in the sequence and, once selected, define the beginning and end of the image sequence for which the flicker removal of the present invention is to be effective. The histograms may be generated from the entire image frame. However, if the sequence represents a motion scene, the image content may vary significantly between frames P and S by virtue of a subject moving into or out of the scene. In such a case it may be preferable to select comparable portions of the respective image frames having image content that is relatively unaffected by changes in scene content. Graph 30 is the histogram for the corresponding image area of the intermediate source image frame F on which the flicker removal is to be effected. Cumulative histograms for each of the reference image frames P and S and for the source image frame F are then derived from the values shown in graphs 20, 40 and 30, as shown by graphs 22, 42, and 32, respectively. The values of the cumulative histograms for the key reference images P and S are then converted to values of corresponding inverse cumulative histograms as shown by graphs 24 and 44. The values of the inverse cumulative histograms for the reference images are then employed to generate values of an interpolated reference inverse cumulative histogram 36 based on the relative position for source image F between the two reference images P and S. This interpolated inverse cumulative histogram is determined by averaging the time weighted values of the inverse cumulative histogram values of the reference images where the time weighting is based on the relative position of the source image F between the two reference images P and S. The values of the interpolated reference cumulative histogram 36 are then converted to values of an interpolated reference cumulative histogram 38 for the source image position F.

One embodiment of the process which achieves the described method may be expressed in the following manner, setting forth the algorithm steps involved. For an image sequence that is to be "deflickered", key image frames in the sequence are selected that represent the desired levels of color or brightness at their respective positions in the sequence. A long image sequence can be broken down in a series of subsequences in this way. Each sub-sequence then becomes a sequence bounded at the beginning and end by the selected key frames. For each key frame, a reference image segment within the frame may be selected that has the correct color and lightness balance for that frame. The entire image segment may be employed for this purpose; however, the actual image content within the frames may vary, e.g. due to subjects entering or leaving the scene represented by the sequence. For this reason it may be preferable to select an image segment for each key frame that has the desired color and lightness balance. If necessary, the image pixel code values of each key frame can be adjusted to a reference frame using one of the known adjustment techniques mentioned above, e.g. histogram matching. The key frame reference images are now designated P and S representing the prior and subsequent reference frames at the opposite ends of the image sequence or sub-sequence.

For a frame F between the reference frames P and S, the same correction method can be employed if a reference frame corresponding to frame F can be derived. This is done as follows:

1. From the histograms (20,40) of each of the images P and S, cumulative histograms (22,42) are generated, designated as CHP(i) and CHS(i), respectively, for normalized pixel code values "i".

2. The relative time position "r" of the source image frame F within the image sequence is then calculated from the respective frame time positions:

$$r = \frac{(t_f - t_p)}{(t_s - t_p)}$$

where $t_f$, $t_p$, and $t_s$ are the time positions within the sequence of frames for frames F, P and S, respectively. This formula gives a linear variation from key frame P to key frame S. Alternate equations for "r" that give values beginning at "0" and ending at "1" may also be used to obtain non-linear effects, such as an "ease in" or "ease out" of the effect.

3. The inverse cumulative histogram CHPI(x) (24) and CHSI(x) (44) for each of the key frame reference images P and S, respectively, are generated from the corresponding cumulative histograms as follows:

*CHIP(x)=smallest i for which CHP(i)>=x*

*CHSI(x)=smallest i for which CHS(s)>=x* where "x" represents cumulative normalized pixel fraction values.

4. The interpolated reference inverse cumulative histogram (36) for the source image frame position in the sequence is then determined by weighted averaging of the inverse cumulative histogram code values in accordance with the following algorithm:

*CHFI(x)=(1−r)CHPI(x)+R\*CHSI(x)*

5. The interpolated cumulative histogram for the reference image at the source image frame position is then determined by the reverse process of step 3:

*CHF(i)=largest x for which CHFI(x)<=i*

Figure 4:
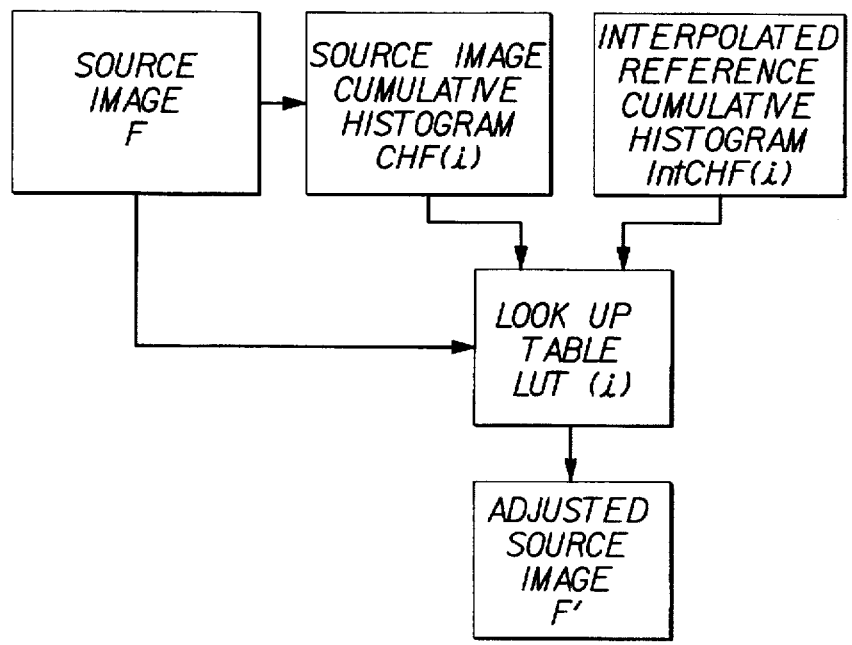
FIG. 4 is a graphical representation of one known method referred to as histogram matching by which an interpolated reference cumulative histogram may be employed to adjust image pixel code values of a source image to remove an undesired image component from the source image.

Once this interpolated cumulative histogram is generated for this position in the image sequence, it may then be used as a reference cumulative histogram for comparison with the actual source image cumulative histogram (32) to generate adjusted code values for the source image which have the undesired image component variation removed. A known technique of histogram matching may be used for this purpose. As shown in FIG. 4, this technique involves generating a cumulative histogram CHF(i) of the source image F and an interpolated cumulative histogram IntCHF(i) of the reference image to which the source image is to be matched. The former is the cumulative histogram 32 (FIG. 3) which is derived at the same time as the cumulative histograms for the reference images P and S. The latter is the interpolated cumulative histogram (solid line 40 in graph 38 of FIG. 3) derived in generating the reference cumulative histogram for source image frame location. In graph 38, the dotted line 42 represents the actual image cumulative histogram of graph 32. From these two histograms, a lookup table 44 LUT(F) is generated from the following relationship.

$$LUT(i)=CHFI(CHF(i))$$

This LUT is then accessed using the image pixel values of the original source image to convert actual code values of the source image F to corrected code values for the adjust frame F' based on the reference image frame values derived in accordance with the invention as described above. When applied to color images, it will be appreciated that the process as described above is carried out independently on each color channel, i.e. red, green and blue.

In the algorithm technique set forth above for deriving the cumulative histogram of the source image, the inverse cumulative histograms for the key frame reference images P and S and for the interpolated inverse cumulative histogram for the source frame position are each fully generated as discrete steps before proceeding to the next step in the process. It is preferred for image processing efficiency to generate the values of the interpolated inverse cumulative histogram directly, i.e. "on the fly" so to speak, so that the interpolated cumulative histogram for the source frame position can be generated simultaneously with generating the values of the cumulative histograms for the reference image frame positions P and S without waiting for generation of complete histograms before proceeding to the next step in the process. The following process achieves this result.

In the embodiment of the process, let CHP and CHS be the two normalized cumulative histograms 22 and 42 from which an interpolated reference cumulative histogram 38 (FIG. 3) is to be formed. CHP and CHS are generated from histograms HP and HS which have maxi and maxj (normalized) elements, respectively, i.e. the maximum number of image pixel code values for each image. A cumulative continuous histogram CHP is determined from the histogram HP by the relation:

$$CHP(0)=0;$$

$$CHP(1)=HP(0)/total;$$

$$CHP(2)=(HP(0)+HP(1))/total;$$

. . .

$$CHP(maxi-1)=(HP(0) \ldots HP(maxi-2))/total$$

where "total" is the sum of all the elements of HP.

Evaluation of histogram HS yields corresponding values for the cumulative histogram CHS. For convenience, the cumulative histograms are defined with an extra element:

CHP(maxi)=1.0 and CHS(maxj)=1.0. CHF is the normalized interpolated reference cumulative histogram for the intermediate frame to be adjusted where CHF(k) is defined for values of k from 0 through maxk.

Algorithmically, the process is started by setting the initial values as follows:

1. i=0, j=0, prevfi=0, prevfj=0 where prevfi and prevfj represent the values of fi and fj at the previous values of i and j, respectively.

2. set fi=CHP(i), fj=CHS(j) where fi and fj represent the values of the previous and subsequent key frame cumulative histograms at i and j, respectively. set fij=smaller of fi and fj 3. set prevfij=larger of prevfi and prevfj.

4.

5. The incremental values, ilow and ihi, of inverse cumulative histogram CHPI at prevfij and fij are determined by:

if (fi is equal to prevfi) then set $ilow=i+(prevfij-prevfi)/(fi-prevfi)$ else if (i is equal to maxi) then set ilow=i, $ihi=i+1$ else set ilow=i, ihi=i 6. The incremental values, jlow and jhi, of inverse cumulative histogram CHSI at prevfij and fij are determined by:

if (fj is equal to prevfj) then set $jlow=j+(prevfij-prevfj)/(fj-prevfj)$ else if (j is equal to maxj) then set jlow=j, $jhi=j+1$ else set jlow=j, jhi=j 7. The incremental values klow and khi are then determined for the inverse interpolated cumulative histogram (CHFI) at prevfij and fij as follows:

$$klow=((1-r)*ilow/maxi+r*jlow/maxj)*maxk$$

$$khi=((1-r)*ihi/maxi+r*jhi/maxi)*maxi$$

8. The values of the interpolated cumulative histogram CHF(k) between klow and khi are then set by the interpolation step:

for each integer k where klow<=k<=khi, set $CHF(k)=prevfij+(fij-prevfih)+(k-klow)/(khi-klow)$.

9. if fij equals fi, increase i, set prevfi=fi 10. if fij equals fj, increase j, set prevfj=fj 11. if i<maxi or j<maxj, for to step 2.

Thus, with the algorithm process just described, the interpolated reference cumulative histogram values are arrived at incrementally without having to first generate the complete inverse cumulative histograms before undertaking to generate the interpolated reference cumulative histogram.

It will be appreciated from the foregoing description that what has been described is an efficient and effective method of deriving an interpolated reference cumulative histogram for an image frame location in a sequence of image frames that is capable of serving as a reference image for a source image at that frame location for the purpose of adjusting image pixel code values of the source image to remove unwanted variations in color or tone while at the same time preserving a desired variation in the color or tone occurring during the image sequence.

The invention has been described with reference to a preferred embodiment. However, it will be appreciated that variations and modifications can be effected by a person of ordinary skill in the art without departing from the scope of the invention.

What is claimed is:

1. A method of interpolating a reference cumulative histogram for a source image frame located within an image sequence bounded by prior and subsequent key image frames, said reference cumulative histogram to be used in adjusting image pixel code values of the source image frame to remove an undesired variation in an image component of the source image frame, while preserving an intentional change in said image component, the method comprising:

generating values of a cumulative histogram of image pixel code values of comparable image areas of each of the prior and subsequent key image frames;

converting the values of the key frame cumulative histograms to values of inverse cumulative histograms;

generating values of an interpolated inverse cumulative histogram from the values of the key frame inverse cumulative histograms based on relative time position of the source image frame between the key image frames; and converting the values of the interpolated inverse cumulative histogram to values of an interpolated reference cumulative histogram for the source image frame to be used in adjusting image pixel values of the source image for removal of said undesired variation of said intentional image component change.

2. A method of interpolating a reference cumulative histogram of image pixel code values for a source image frame positioned between prior and subsequent key image frames in a sequence of motion images having an intentional variation in a component of the images in the sequence, the method comprising the steps of:

generating a cumulative histogram for each of the prior and subsequent key image frames;

determining relative time position of the source image frame between the prior and subsequent key image frames;

converting the reference frame cumulative histograms to inverse cumulative histograms;

generating an interpolated inverse cumulative histogram from the key frame inverse cumulative histograms based on the determined relative time position of the source image frame between the key image frames; and converting the interpolated inverse cumulative histogram to an interpolated reference cumulative histogram.

3. A method of removing undesired image component variations from source image frames within a sequence of image frames having an intentionally varying image component in the sequence, the method comprising the steps of:

selecting a source image frame for which image pixel code values are to be adjusted to remove said undesired image component variation;

selecting first and second key frames in the image frame sequence respectively before and after the selected source image frame;

generating values of cumulative histograms for comparable image areas of each of the first, second and source image frames;

determining relative time position of the source image frame between the first and second key image frames;

converting the values of the key frame cumulative histograms to inverse cumulative histograms;

generating values of an interpolated inverse cumulative histogram from the key frame inverse cumulative histograms based on the determined relative time position of the source image frame between the key image frames;

converting the values of the interpolated inverse cumulative histogram to values of an interpolated reference cumulative histogram;

generating a LUT of image pixel values from the cumulative histogram of the intermediate image frame and the interpolated reference cumulative histogram; and adjusting said intermediate image frame in accordance with image pixel values obtained from said LUT.

* * * * *